US012325247B2

(12) United States Patent
Otsuru et al.

(10) Patent No.: US 12,325,247 B2
(45) Date of Patent: Jun. 10, 2025

(54) LIQUID RESERVOIR, LIQUID EJECTING APPARATUS, AND METHOD FOR CONTROLLING LIQUID EJECTING APPARATUS

(71) Applicant: SEIKO EPSON CORPORATION, Tokyo (JP)

(72) Inventors: Munechika Otsuru, Matsumoto (JP); Toshio Kumagai, Shiojiri (JP); Akira Shinoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 274 days.

(21) Appl. No.: 18/185,133

(22) Filed: Mar. 16, 2023

(65) Prior Publication Data

US 2023/0294413 A1 Sep. 21, 2023

(30) Foreign Application Priority Data

Mar. 17, 2022 (JP) ................................ 2022-042266

(51) Int. Cl.
*B41J 2/175* (2006.01)
*B41J 2/19* (2006.01)

(52) U.S. Cl.
CPC ............ *B41J 2/17596* (2013.01); *B41J 2/19* (2013.01); *B41J 2202/07* (2013.01)

(58) Field of Classification Search
CPC ....... B41J 2/17596; B41J 2/19; B41J 2202/07
See application file for complete search history.

(56) References Cited

U.S. PATENT DOCUMENTS

| | | | |
|---|---|---|---|
| 2019/0118541 | A1 | 4/2019 | Otsuki |
| 2019/0344580 | A1 | 11/2019 | Kumagai et al. |

FOREIGN PATENT DOCUMENTS

| | | | | |
|---|---|---|---|---|
| JP | 2019-077107 | A | | 5/2019 |
| JP | 2019-195918 | A | | 11/2019 |
| JP | 2020-104271 | A | | 7/2020 |
| KR | 20040029268 | A | * | 4/2004 |

* cited by examiner

*Primary Examiner* — Justin Seo
(74) *Attorney, Agent, or Firm* — WORKMAN NYDEGGER

(57) ABSTRACT

A liquid reservoir includes: an inflow portion configured to have a liquid flow therethrough; a storage portion configured to store the liquid flowing in through the inflow portion; an outflow portion configured to have the liquid in the storage portion flow out therethrough; a first channel having one end coupled to the outflow portion and the other end opening into the storage portion; a second channel having one end coupled to the outflow portion and the other end opening into the storage portion; and an opening/closing portion configured to open and close the first channel, in which the other end of the first channel opens at a position higher than the other end of the second channel.

14 Claims, 6 Drawing Sheets

LIQUID RESERVOIR, LIQUID EJECTING APPARATUS, AND METHOD FOR CONTROLLING LIQUID EJECTING APPARATUS

The present application is based on, and claims priority from JP Application Serial Number 2022-042266, filed Mar. 17, 2022, the disclosure of which is hereby incorporated by reference herein in its entirety.

BACKGROUND

1. Technical Field

The present disclosure relates to a liquid reservoir, a liquid ejecting apparatus, and a method for controlling the liquid ejecting apparatus.

2. Related Art

For example, JP-A-2019-77107 discloses a liquid ejecting apparatus that performs printing by ejecting ink as an example of a liquid from a liquid ejecting head as an example of a liquid ejecting portion. The liquid ejecting apparatus includes a flow channel structure as an example of a liquid reservoir. The flow channel structure includes a first circulation channel as an example of an inflow portion, a second circulation channel as an example of a storage portion, and a third circulation channel as an example of an outflow portion.

The first to third circulation channels circulate ink from a liquid supply source to the liquid ejecting head. A bubble chamber configured to store bubbles is provided above the second circulation channel. The third circulation channel is coupled to the second circulation channel at a position below the bubble chamber.

When the storage portion has a space above the outflow portion, bubbles can be easily stored. However, when the storage portion is filled with the liquid, air is likely to remain in the space above the outflow portion.

SUMMARY

A liquid reservoir to solve the above problem includes: an inflow portion configured to have a liquid flow therethrough; a storage portion configured to store the liquid flowing in through the inflow portion; an outflow portion configured to have the liquid in the storage portion flow out therethrough; a first channel having one end coupled to the outflow portion and the other end opening into the storage portion; a second channel having one end coupled to the outflow portion and the other end opening into the storage portion; and an opening/closing portion configured to open and close the first channel, in which the other end of the first channel opens at a position higher than the other end of the second channel.

A liquid ejecting apparatus to solve the above problem includes: a liquid ejecting portion configured to eject a liquid; a supply channel that communicates a liquid supply source that houses the liquid with the liquid ejecting portion; a liquid reservoir provided in the middle of the supply channel; and a drive portion, in which the liquid reservoir includes an inflow portion configured to have the liquid flow therethrough, the liquid being supplied from the liquid supply source; a storage portion configured to store the liquid flowing in through the inflow portion; an outflow portion configured to have the liquid in the storage portion flow out therethrough toward the liquid ejecting portion; a first channel having one end coupled to the outflow portion and the other end opening into the storage portion; a second channel having one end coupled to the outflow portion and the other end opening into the storage portion; and an opening/closing portion configured to open and close the first channel, in which the drive portion is configured to drive the opening/closing portion, and the other end of the first channel opens at a position higher than the other end of the second channel.

A method to solve the above problem is a method for controlling a liquid ejecting apparatus including a liquid ejecting portion configured to eject a liquid, a supply channel that communicates a liquid supply source that houses the liquid with the liquid ejecting portion, a liquid reservoir including an inflow portion configured to have the liquid flow therethrough, the liquid being supplied from the liquid supply source, a storage portion configured to store the liquid flowing in through the inflow portion, an outflow portion configured to have the liquid in the storage portion flow out therethrough toward the liquid ejecting portion, a first channel having one end coupled to the outflow portion and the other end opening into the storage portion, a second channel having one end coupled to the outflow portion and the other end opening into the storage portion, and an opening/closing portion configured to open and close the first channel, a drive portion configured to drive the opening/closing portion, and a pump configured to cause the liquid in the supply channel to flow from the liquid supply source side to the liquid ejecting portion side, in which the other end of the first channel opens at a position higher than the other end of the second channel, the method including: opening the first channel by the drive portion driving the opening/closing portion; filling the supply channel, the liquid reservoir, and the liquid ejecting portion with the liquid by driving the pump with the first channel opened; closing the first channel by the drive portion driving the opening/closing portion; and supplying the liquid to the liquid ejecting portion through the second channel.

A method to solve the above problem is a method for controlling a liquid ejecting apparatus including a liquid ejecting portion configured to eject a liquid, a supply channel that communicates a liquid supply source that houses the liquid with the liquid ejecting portion, a liquid reservoir including an inflow portion configured to have the liquid flow therethrough, the liquid being supplied from the liquid supply source, a storage portion configured to store the liquid flowing in through the inflow portion, an outflow portion configured to have the liquid in the storage portion flow out therethrough toward the liquid ejecting portion, a first channel having one end coupled to the outflow portion and the other end opening into the storage portion, a second channel having one end coupled to the outflow portion and the other end opening into the storage portion, and an opening/closing portion configured to open and close the first channel, a drive portion configured to drive the opening/closing portion, and a pump configured to cause the liquid in the supply channel to flow from the liquid supply source side to the liquid ejecting portion side, and a return channel coupled to a first connection portion provided upstream of the liquid reservoir and a second connection portion provided downstream of the liquid reservoir in the supply channel, and configured to form a circulation channel together with the supply channel, in which the other end of the first channel opens at a position higher than the other end of the second channel, the method including: opening the first channel by the drive portion driving the opening/closing portion; filling the supply channel, the liquid reservoir, and the liquid ejecting portion with the liquid by driving the pump with the first channel opened; closing the first channel by the drive portion driving the opening/closing portion; filling the return channel with the liquid by driving the pump with the first channel closed; and supplying the liquid to the liquid ejecting portion through the second channel.

DESCRIPTION OF EXEMPLARY EMBODIMENTS

Embodiment

Figure 1:
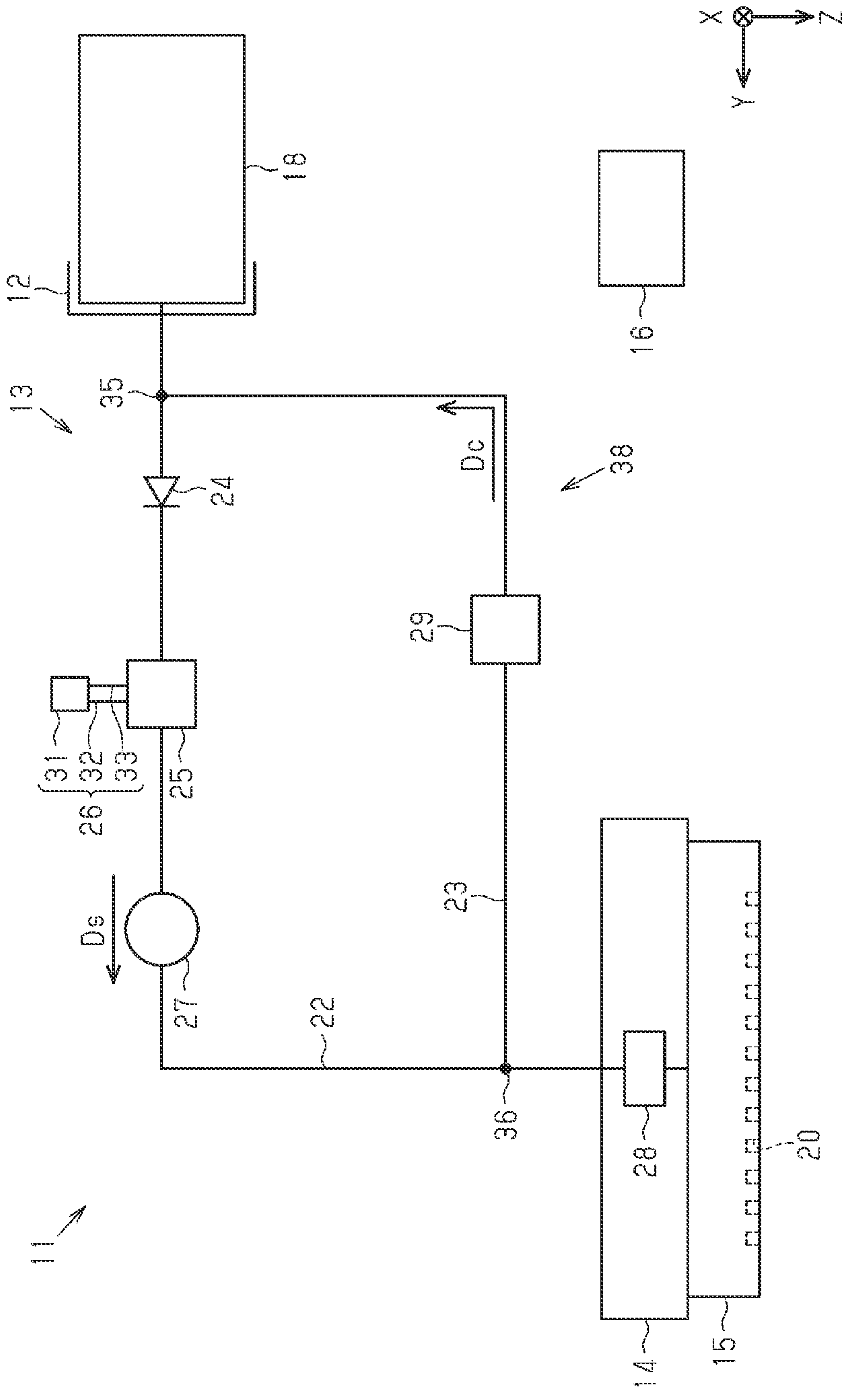
FIG. 1 is a schematic view of an embodiment of a liquid ejecting apparatus.

An embodiment of a liquid reservoir, a liquid ejecting apparatus, and a method for controlling the liquid ejecting apparatus will be described below with reference to the drawings. The liquid ejecting apparatus is an ink jet printer that performs printing by ejecting ink as an example of a liquid onto a medium such as paper, fabric, vinyl, plastic parts, and metal parts, for example.

In the drawings, assuming that a liquid ejecting apparatus 11 is placed on a horizontal plane, the direction of gravity is indicated by a Z-axis and the directions along the horizontal plane are indicated by an X-axis and a Y-axis. The X-axis, Y-axis, and Z-axis are orthogonal to each other. In the following description, a direction parallel to the Z-axis is also referred to as a vertical direction Z, and upper and lower sides in the vertical direction Z are also referred to as high and low, respectively.

Liquid Ejecting Apparatus

As shown in FIG. 1, the liquid ejecting apparatus 11 may include a mounting portion 12, a supply mechanism 13, a holding portion 14, a liquid ejecting portion 15, and a control portion 16.

The control portion 16 performs overall control of driving of each mechanism in the liquid ejecting apparatus 11 and controls various operations performed in the liquid ejecting apparatus 11.

The control portion 16 can be configured as a circuit including a: one or more processors that execute various kinds of processing according to a computer program, one or more dedicated hardware circuits that execute at least some of the various kinds of processing, or y: a combination thereof. The hardware circuit is an application specific integrated circuit, for example. The processor includes a CPU and a memory such as a RAM and a ROM. The memory stores a program code or command configured to cause the CPU to perform the processing. The memory, that is, a computer-readable medium includes any readable media that can be accessed by a general-purpose or dedicated computer.

A liquid supply source 18 containing a liquid may be detachably mounted on the mounting portion 12. When the liquid supply source 18 can be replenished with the liquid, the liquid supply source 18 may be fixed to the mounting portion 12.

The holding portion 14 holds the liquid ejecting portion 15. When the liquid ejecting portion 15 is of a serial type, the holding portion 14 may be a carriage that reciprocates the liquid ejecting portion 15 across the medium. When the liquid ejecting portion 15 is of a line type, the holding portion 14 may hold the liquid ejecting portion 15 fixed on a transport path of the medium.

The liquid ejecting portion 15 can eject the liquid. The liquid ejecting portion 15 ejects the liquid from a plurality of nozzles 20 for printing on a medium (not shown). The liquid ejecting portion 15 ejects the liquid supplied by the supply mechanism 13.

Supply Mechanism

The supply mechanism 13 supplies the liquid to the liquid ejecting portion 15 from the liquid supply source 18 mounted on the mounting portion 12. The supply mechanism 13 may include a supply channel 22 and a return channel 23. The supply mechanism 13 may include a one-way valve 24, a liquid reservoir 25, a drive portion 26, a pump 27, a first pressure regulating valve 28, and a second pressure regulating valve 29. The drive portion 26 may include a pressure change portion 31, a compression channel 32, and a decompression channel 33.

The supply channel 22, the return channel 23, the compression channel 32, and the decompression channel 33 may each be formed of a flexible tube. Each channel may be formed of a perforated rigid member. Each channel may be formed by covering a groove formed in a rigid member with a film, a rigid member, or the like. Each channel may be formed by combining a plurality of members such as a tube and a rigid member, for example.

The supply channel 22 may have its upstream end provided in the mounting portion 12. The upstream end of the supply channel 22 may be, for example, a hollow needle that pierces the liquid supply source 18. The liquid contained in the liquid supply source 18 can flow out through the supply channel 22 by coupling the upstream end of the supply channel 22 to the liquid supply source 18 mounted on the mounting portion 12.

The supply channel 22 has its downstream end coupled to the liquid ejecting portion 15. The supply channel 22 communicates between the liquid supply source 18 and the liquid ejecting portion 15. Communicating means coupling so as to set a state where a fluid such as a liquid and gas can flow. In other words, the supply channel 22 couples the liquid supply source 18 to the liquid ejecting portion 15 in a state where the liquid can flow. The supply channel 22 can supply the liquid from the upstream where the liquid supply source 18 is provided to the downstream where the liquid ejecting portion 15 is provided. The one-way valve 24, the liquid reservoir 25, the pump 27, and the first pressure regulating valve 28 are provided in the supply channel 22 in this order from the upstream in a supply direction Ds. The one-way valve 24, the liquid reservoir 25, the pump 27, and the first pressure regulating valve 28 are provided in the middle of the supply channel 22.

A first connection portion 35 and a second connection portion 36 are provided in the supply channel 22. The first and second connection portions 35 and 36 may be provided in the middle of the supply channel 22.

The first connection portion 35 may be provided upstream of the liquid reservoir 25 in the supply channel 22. The first connection portion 35 of this embodiment is provided between the upstream end of the supply channel 22 and the one-way valve 24.

The second connection portion 36 is provided downstream of the first connection portion 35. The second connection portion 36 may be provided downstream of the liquid reservoir 25. The second connection portion 36 may be provided downstream of the pump 27 in the supply channel 22. The second connection portion 36 of this embodiment is provided between the pump 27 and the first pressure regulating valve 28.

The return channel 23 is coupled to the first and second connection portions 35 and 36. The return channel 23 has its both ends coupled to the supply channel 22. The return channel 23 has one end coupled to the first connection portion 35 and the other end coupled to the second connection portion 36. The second pressure regulating valve 29 is provided in the return channel 23.

The return channel 23 forms a circulation channel 38 together with the supply channel 22. To be more specific, the supply channel 22 and the return channel 23 between the first and second connection portions 35 and 36 constitute the circulation channel 38. The one-way valve 24, the liquid reservoir 25, the pump 27, and the second pressure regulating valve 29 are provided in the circulation channel 38.

The one-way valve 24 may be provided between the upstream end of the supply channel 22 and the liquid reservoir 25 in the supply channel 22. The one-way valve 24 allows the liquid to flow downstream in the supply direction Ds and restricts the liquid from flowing upstream in the supply direction Ds.

The pump 27 is provided downstream of the liquid reservoir 25 in the supply channel 22. The pump 27 may be provided between the liquid reservoir 25 and the first pressure regulating valve 28. The pump 27 can cause the liquid to flow from upstream to downstream. That is, the pump 27 can cause the liquid in the supply channel 22 to flow from the liquid supply source 18 side to the liquid ejecting portion 15 side. The pump 27 supplies the liquid under pressure in the supply direction Ds. The pump 27 may be a metering pump such as a diaphragm pump driven by a motor, for example.

The first pressure regulating valve 28 is provided downstream of the pump 27 in the supply channel 22. The first pressure regulating valve 28 opens the supply channel 22 when the pressure inside the liquid ejecting portion 15 falls below a predetermined negative pressure. The predetermined negative pressure is a pressure at which a concave liquid surface is formed in the nozzle 20 with respect to a direction in which the liquid is ejected from the nozzle 20. The first pressure regulating valve 28 stabilizes the pressure of the liquid supplied to the nozzle 20 by regulating the pressure of the liquid supplied under pressure. The first pressure regulating valve 28 may be provided in the holding portion 14.

The second pressure regulating valve 29 may open the return channel 23 when the pressure on the second connection portion 36 side exceeds a predetermined pressure. The predetermined pressure is a pressure lower than a withstand pressure of the supply channel 22 and the return channel 23. The predetermined pressure is a pressure lower than a pressure that can be applied to the liquid by the pump 27. The second pressure regulating valve 29 closes the return channel 23 when the first pressure regulating valve 28 opens the supply channel 22. The second pressure regulating valve 29 may open the return channel 23 when the pump 27 is driven with the supply channel 22 closed by the first pressure regulating valve 28. When the second pressure regulating valve 29 opens the return channel 23, the liquid circulates through the circulation channel 38 in a circulation direction Dc.

The pressure change portion 31 is an air pump, for example. The pressure change portion 31 of this embodiment can supply pressurized air to the liquid reservoir 25 through the compression channel 32. The pressure change portion 31 of this embodiment can aspirate air from the liquid reservoir 25 through the decompression channel 33.

Liquid Reservoir

Figure 2:
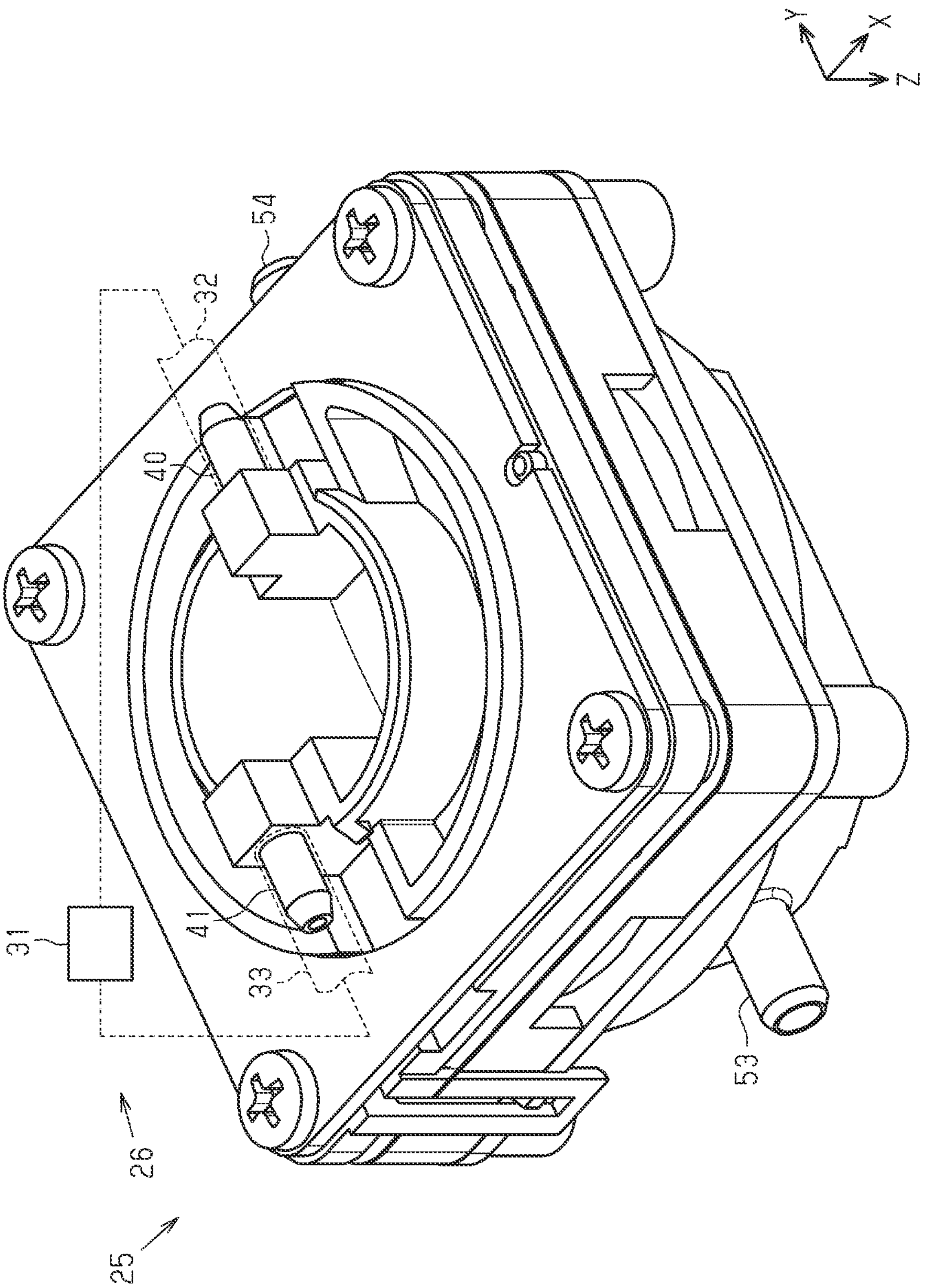
FIG. 2 is a perspective view of a liquid reservoir.
Figure 3:
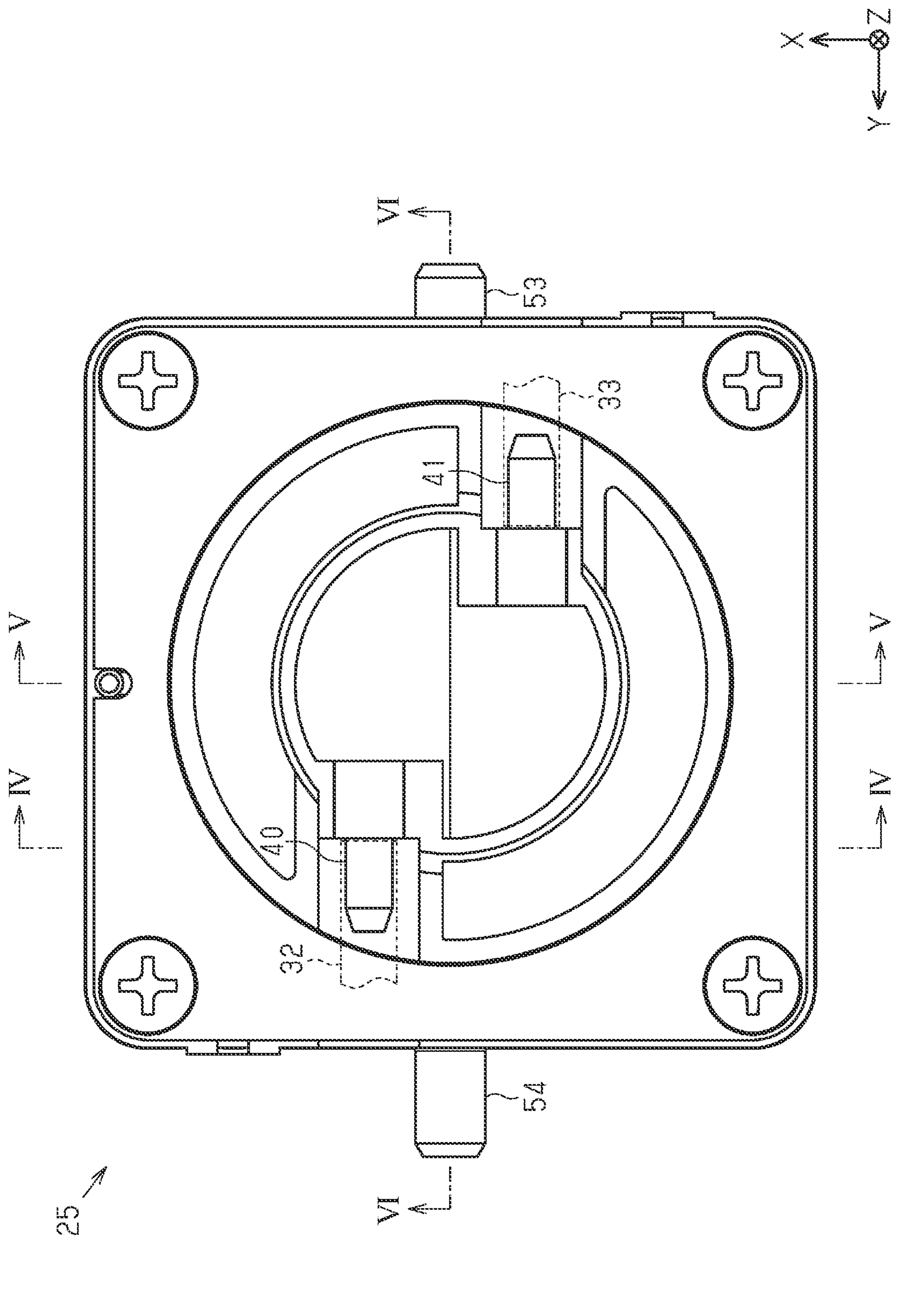
FIG. 3 is a plan view of the liquid reservoir.

As shown in FIGS. 2 and 3, the liquid reservoir 25 may include a compression portion 40 and a decompression portion 41. The compression channel 32 is coupled to the compression portion 40. The decompression channel 33 is coupled to the decompression portion 41. That is, the compression channel 32 has its upstream end coupled to the pressure change portion 31 and its downstream end coupled to the compression portion 40. The decompression channel 33 has its upstream end coupled to the decompression portion 41 and its downstream end coupled to the pressure change portion 31.

Figure 4:
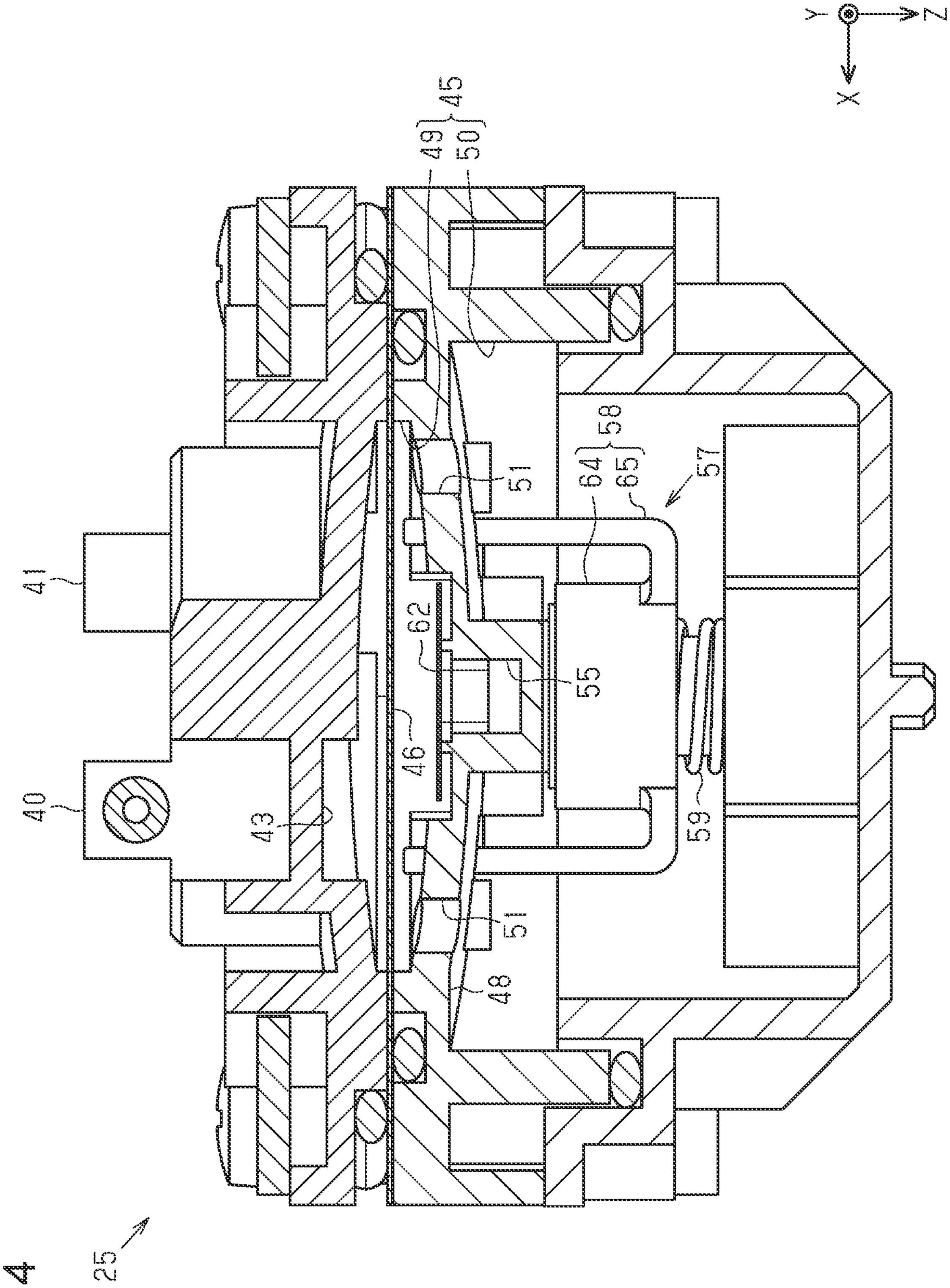
FIG. 4 is a cross-sectional view taken along the line IV-IV in the direction of the arrows in FIG. 3.

As shown in FIG. 4, the liquid reservoir 25 may include an air chamber 43. The compression portion 40 communicates the compression channel 32 with the air chamber 43. The decompression portion 41 communicates the decompression channel 33 with the air chamber 43. The pressure change portion 31 pressurizes the inside of the air chamber 43 by causing air to flow into the air chamber 43 through the compression channel 32 and the compression portion 40. The pressure change portion 31 reduces the pressure inside the air chamber 43 by aspirating air from the air chamber 43 through the decompression channel 33 and the decompression portion 41. That is, the pressure change portion 31 can change the pressure inside the air chamber 43.

The liquid reservoir 25 has a storage portion 45. The storage portion 45 may be formed of a flexible portion 46 that is partially flexible. The flexible portion 46 may be provided above the storage portion 45. The flexible portion 46 may be formed of a film member that is impermeable to liquid and permeable to gas. The flexible portion 46 is, for example, a resin film. The flexible portion 46 may partition the storage portion 45 and the air chamber 43. In other words, the air chamber 43 is separated from the storage portion 45 by the flexible portion 46.

Figure 5:
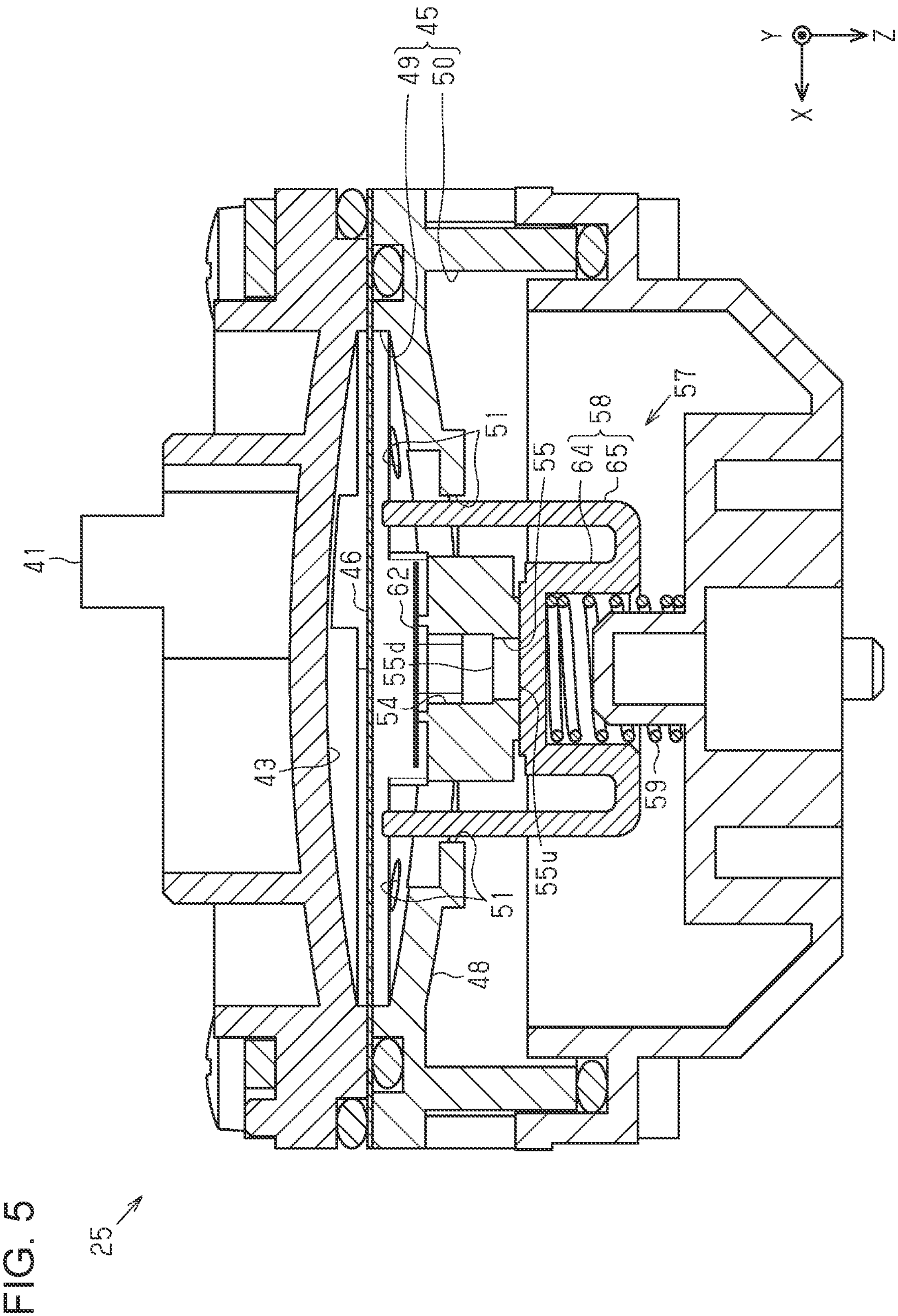
FIG. 5 is a cross-sectional view taken along the line V-V in the direction of the arrows in FIG. 3.

As shown in FIGS. 4 and 5, the liquid reservoir 25 may have a partition wall 48. The partition wall 48 partitions the storage portion 45 into upper and lower parts. The storage portion 45 may have an upper chamber 49 and a lower chamber 50. The upper chamber 49 is located above the partition wall 48. The lower chamber 50 is located below the partition wall 48. The flexible portion 46 of this embodiment forms part of the upper chamber 49. At least one through-hole 51 is formed in the partition wall 48. The through-hole 51 communicates the upper chamber 49 with the lower chamber 50.

Figure 6:
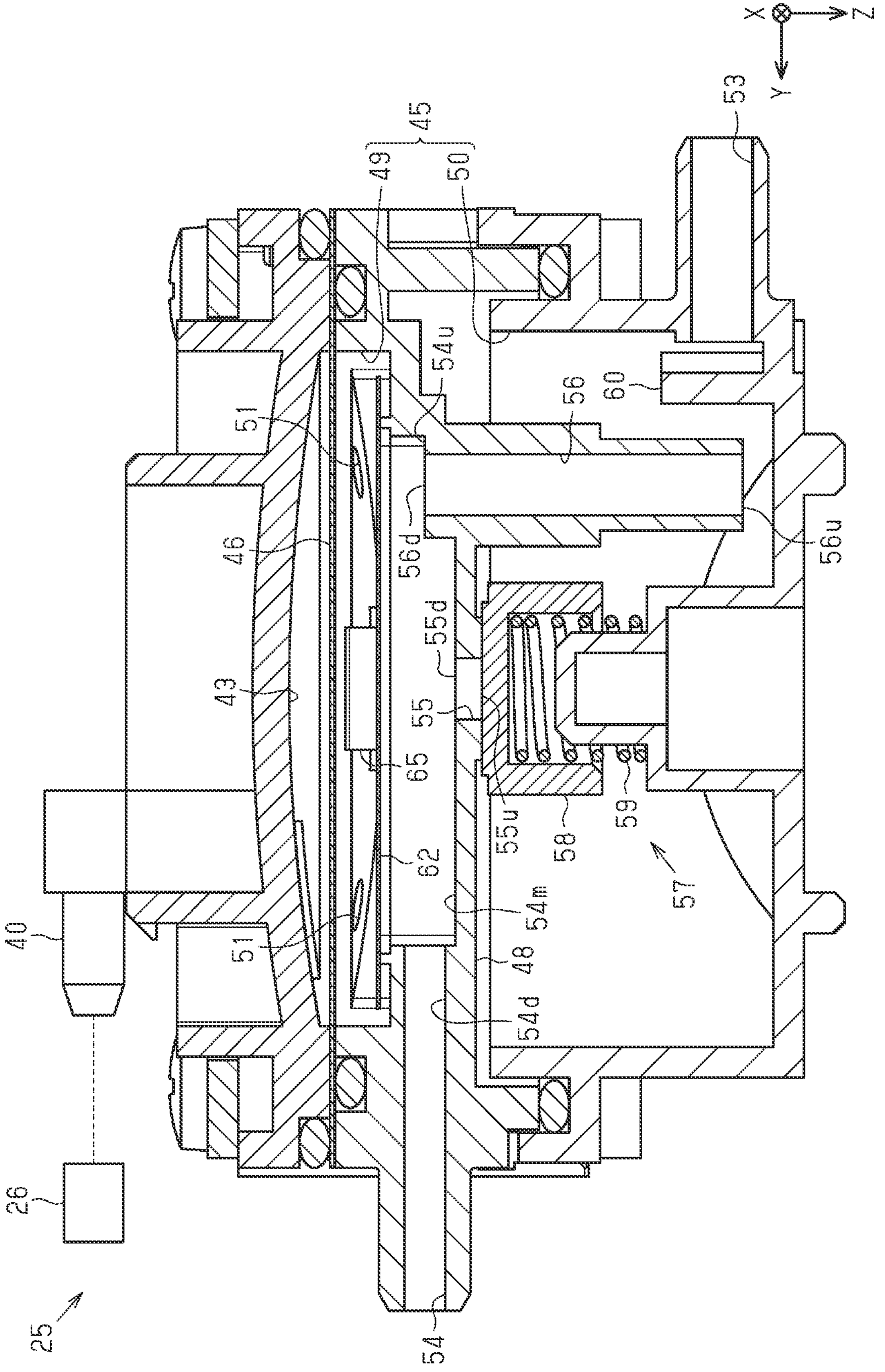
FIG. 6 is a cross-sectional view taken along the line VI-VI in the direction of the arrows in FIG. 3.

As shown in FIG. 6, the liquid reservoir 25 includes an inflow portion 53, an outflow portion 54, a first channel 55, a second channel 56, and an opening/closing portion 57. The opening/closing portion 57 may include a valve 58, the flexible portion 46, and a spring 59. More specifically, the flexible portion 46 that forms part of the storage portion 45 may also function as the opening/closing portion 57. The liquid reservoir 25 may have a barrier 60.

The liquid can flow into the inflow portion 53. The liquid supplied from the liquid supply source 18 and the liquid circulating through the circulation channel 38 can flow into the inflow portion 53 of this embodiment. The inflow portion 53 may be inserted into a tube, for example, that forms the supply channel 22. The inflow portion 53 is communicated with the lower chamber 50. The storage portion 45 can store the liquid flowing in through the inflow portion 53. The inflow portion 53 of this embodiment is located below the air chamber 43, the flexible portion 46, and the partition wall 48.

The liquid in the storage portion 45 can flow out through the outflow portion 54. The liquid in the storage portion 45 flows out through the outflow portion 54 toward the liquid ejecting portion 15. The outflow portion 54 of this embodiment is located above the inflow portion 53. The outflow portion 54 of this embodiment is located below the flexible portion 46 and the air chamber 43. The outflow portion 54 may have an upstream portion **54*u*, a midstream portion 54*m*, and a downstream portion 54*d*. The upstream portion 54*u* and the midstream portion 54*m* of this embodiment are formed by blocking a part of the partition wall 48 with a film 62. The midstream portion 54*m* may be located between the upstream portion 54*u* and the downstream portion 54*d*. The midstream portion 54*m* may have a cross-sectional area larger than those of the upstream portion 54*u* and the downstream portion 54*d*. The cross-sectional area of the upstream portion 54*u* may be larger than that of the downstream portion 54*d***.

The first channel 55 is coupled to the outflow portion 54 at a first downstream end **55*d* thereof, which is an example of one end. The first downstream end 55*d* of this embodiment is coupled to the midstream portion 54*m*. A first upstream end 55*u*, which is an example of the other end of the first channel 55, opens inside the storage portion 45. The first upstream end 55*u* is located below the first downstream end 55*d***.

The second channel 56 is coupled to the outflow portion 54 at a second downstream end **56*d* thereof, which is an example of one end. The second downstream end 56*d* of this embodiment is coupled to the upstream portion 54*u*. A second upstream end 56*u*, which is an example of the other end of the second channel 56, opens inside the storage portion 45**.

The first upstream end **55*u* of the first channel 55 opens above the second upstream end 56*u* of the second channel 56. The first downstream end 55*d* is located below the second downstream end 56*d*. The length of the first channel 55 from the first upstream end 55*u* to the first downstream end 55*d* is shorter than that of the second channel 56 from the second upstream end 56*u* to the second downstream end 56*d***.

The barrier 60 may be provided between the inflow portion 53 and the second upstream end **56*u*. The barrier 60 may have its upper end located above the second upstream end 56*u* and the inflow portion 53. The barrier 60 may have its lower end located below the second upstream end 56*u* and the inflow portion 53. The barrier 60 may hide the inflow portion 53 from the second upstream end 56*u***.

As shown in FIG. 5, the valve 58 may have a valve portion 64 and a lever 65. The valve 58 may have a plurality of levers 65. The valve portion 64 is provided in the lower chamber 50. The lever 65 has its base end fixed to the valve portion 64 and its leading end located in the upper chamber 49. The lever 65 is inserted into the through-hole 51. The spring 59 pushes the valve 58. The valve 58 pushed by the spring 59 closes the first channel 55 by the valve portion 64 closing the first upstream end **55*u***.

Operations of Embodiment

Operations of this embodiment will be described.

As shown in FIG. 1, when the supply mechanism 13 and the liquid ejecting portion 15 are filled with the liquid, the control portion 16 controls the first pressure regulating valve 28 to open the supply channel 22. The supply channel 22 may be opened, for example, by pressing a valve body (not shown) of the first pressure regulating valve 28 to move the valve body from a position for closing the supply channel 22 to a position for opening the supply channel 22. The supply channel 22 may be opened by applying a negative pressure to the nozzle 20 from the outside of the liquid ejecting portion 15.

As shown in FIG. 6, the drive portion 26 can drive the opening/closing portion 57. The drive portion 26 may be controlled by the control portion 16. The opening/closing portion 57 can open and close the first channel 55. The control portion 16 opens the first channel 55 when the supply mechanism 13 and the liquid ejecting portion 15 are filled with the liquid, for example. The first channel 55 is opened by the drive portion 26 driving the opening/closing portion 57. In this embodiment, the first channel 55 is opened by the displaced flexible portion 46 coming into contact with the valve 58.

The control portion 16 pressurizes the air chamber 43 by controlling the driving of the drive portion 26. When the pressure in the air chamber 43 increases, the flexible portion 46 is displaced so as to increase the volume of the air chamber 43 and to decrease the volume of the upper chamber 49. That is, the flexible portion 46 is displaced by the driving of the drive portion 26. The air inside the upper chamber 49 is sent to the lower chamber 50 through the through-hole 51. The air inside the lower chamber 50 is sent to the outflow portion 54 through the second channel 56.

The displaced flexible portion 46 pushes down the lever 65. The flexible portion 46 moves the valve 58 downward against the force of the spring 59. The valve 58 opens the first channel 55 by moving away from the first upstream end **55*u*. When the first channel 55 is opened, the air inside the storage portion 45 can pass through the first channel 55**.

The control portion 16 drives the pump 27 with the first channel 55 opened. The pump 27 is driven to fill the supply channel 22, the liquid reservoir 25, and the liquid ejecting portion 15 with the liquid. To be more specific, when the pump 27 is driven, the liquid in the liquid supply source 18 flows out to the supply channel 22 and is supplied to the liquid reservoir 25 through the one-way valve 24. The liquid supplied to the liquid reservoir 25 flows into the lower chamber 50 of the storage portion 45 from the inflow portion 53.

As the liquid flows into the lower chamber 50, the liquid level in the lower chamber 50 rises. Since the second upstream end **56*u* is located below the first upstream end 55*u*, the liquid flows into the second channel 56 before the first channel 55**.

The liquid level in the lower chamber 50 and the liquid level in the second channel 56 rise while maintaining substantially the same height. The air inside the storage portion 45 is discharged to the outflow portion 54 from the first channel 55. The air is sent to the liquid ejecting portion 15 from the outflow portion 54 through the supply channel 22 and is discharged through the nozzle 20.

When the liquid level rises to the first upstream end **55*u*, the liquid flows into the first channel 55. The liquid level in the first channel 55 and the liquid level in the second channel 56 rise while maintaining substantially the same height. Since the first downstream end 55*d* is located below the second downstream end 56*d*, the liquid flows into the outflow portion 54 through the first channel 55 before the second channel 56. When the liquid level in the outflow portion 54 rises to the height of the second downstream end 56***d*, the liquid flows into the outflow portion 54 through the first channel 55 and the second channel 56.

When the liquid flowing out of the outflow portion 54 fills the supply channel 22 and the liquid ejecting portion 15 downstream of the liquid reservoir 25, the control portion 16 closes the first channel 55 and the supply channel 22. The first channel 55 is closed by the drive portion 26 driving the opening/closing portion 57. In this embodiment, the first channel 55 is closed by the flexible portion 46 moving away from the valve 58.

The control portion 16 may reduce the pressure inside the air chamber 43 by controlling the driving of the drive portion 26 to aspirate the air from the air chamber 43. When the force of the air chamber 43 pushing the valve 58 is reduced to be smaller than the force of the spring 59 pushing the valve 58, the flexible portion 46 is displaced so as to reduce the volume of the air chamber 43. That is, the flexible portion 46 is displaced so as to increase the volume of the upper chamber 49. The liquid flows into the upper chamber 49 whose volume has increased from the lower chamber 50 through the through-hole 51.

The displaced flexible portion 46 stops pushing the lever 65. The valve 58 closes the first channel 55 by blocking the first upstream end 55*u* with the force of the spring 59. When the first channel 55 is closed, the liquid inside the storage portion 45 moves to the outflow portion 54 through the second channel 56.

As shown in FIG. 1, the air remains in the return channel 23 even after the supply channel 22 and the liquid ejecting portion 15 are filled with the liquid. The control portion 16 drives the pump 27 with the first channel 55 closed to fill the return channel 23 with the liquid. To be more specific, the control portion 16 causes the first pressure regulating valve 28 to close the supply channel 22. When the pump 27 is driven, the liquid flows into the return channel 23 from the second connection portion 36. The return channel 23 is opened when the pressure on the second connection portion 36 side exceeds the predetermined pressure.

When the return channel 23 is opened, the air inside the return channel 23 is pushed by the liquid flowing in from the second connection portion 36. The air flows into the supply channel 22 from the first connection portion 35 and is sent to the liquid reservoir 25 through the one-way valve 24.

As shown in FIG. 6, the air flowing into the storage portion 45 passes through the through-hole 51 and gathers in the upper chamber 49. When the pressure in the air chamber 43 is reduced, the air inside the storage portion 45 can easily pass through the flexible portion 46. Here, the control portion 16 may control the driving of the drive portion 26 to reduce the pressure in the air chamber 43 at any time except when the first channel 55 is opened. The air that has gathered in the storage portion 45 is discharged by passing through the flexible portion 46 without passing through the nozzle 20. The liquid flowing into the storage portion 45 flows out of the liquid reservoir 25 through the second channel 56 and the outflow portion 54. The liquid circulates through the circulation channel 38 in the circulation direction Dc.

When the liquid is consumed by the liquid ejecting portion 15, the first pressure regulating valve 28 opens the supply channel 22 and thus the liquid is supplied to the liquid ejecting portion 15. The supply mechanism 13 is replenished with the amount of liquid spent by supplying to the liquid ejecting portion 15, from the liquid supply source 18. The liquid flowing into the storage portion 45 from the inflow portion 53 is sent to the outflow portion 54 through the second channel 56. When supplying the liquid to the liquid ejecting portion 15, the liquid is supplied through the second channel 56.

When the liquid is circulated and when the liquid is supplied to the liquid ejecting portion 15, the liquid flows into the storage portion 45 from the inflow portion 53. Since the barrier 60 is provided between the inflow portion 53 and the second upstream end 56*u*, a linear flow from the inflow portion 53 to the second channel 56 is blocked by the barrier 60. Therefore, it is possible to reduce the risk of bubbles contained in the liquid flowing into the second channel 56 together with the liquid, making it easier to accumulate the bubbles in the storage portion 45.

Effects of Embodiment

Effects of this embodiment will be described.

(1) The opening/closing portion 57 can open and close the first channel 55. When the opening/closing portion 57 closes the first channel 55, the liquid flowing into the storage portion 45 from the inflow portion 53 flows through the second channel 56 from the second upstream end 56*u* to the second downstream end 56*d*. The second upstream end 56*u* of the second channel 56 opens below the first upstream end 55*u* of the first channel 55. Therefore, closing the first channel 55 can makes it easier to collect air bubbles in the storage portion 45. When the opening/closing portion 57 opens the first channel 55, the liquid flowing into the storage portion 45 from the inflow portion 53 flows through the first channel 55 from the first upstream end 55*u* to the first downstream end 55*d* and also flows through the second channel 56 from the second upstream end 56*u* to the second downstream end 56*d*. The first upstream end 55*u* of the first channel 55 opens above the second upstream end 56*u* of the second channel 56. Therefore, when the storage portion 45 is filled with the liquid, for example, the air inside the storage portion 45 is readily discharged by opening the first channel 55. Thus, the air can be easily discharged when filling the liquid.

(2) The opening/closing portion 57 opens the first channel 55 by bringing the flexible portion 46 into contact with the valve 58. Therefore, by displacing the flexible portion 46 from outside the storage portion 45, the first channel 55 can be opened and closed.

(3) The upper part of the storage portion 45 is formed of a film member that is impermeable to liquid and permeable to gas. Therefore, the air bubbles trapped in the storage portion 45 can be discharged from the storage portion 45 through the film member.

(4) The drive portion 26 displaces the flexible portion 46. The displaced flexible portion 46 comes into contact with the valve 58 to open the first channel 55. Therefore, the drive portion 26 can open and close the first channel 55 from outside of the storage portion 45.

(5) Since the pressure change portion 31 changes the pressure in the air chamber 43 to displace the flexible portion 46, the first channel 55 can be easily opened and closed.

(6) The pump 27 is provided downstream of the liquid reservoir 25. More specifically, the pump 27 pressurizes the liquid drawn from the liquid reservoir 25 and sends the liquid to the liquid ejecting portion 15. Therefore, the pressure in the storage portion 45 is lowered compared to the case where the pump 27 is provided upstream of the liquid reservoir 25. Thus, the drive portion 26 can easily drive the opening/closing portion 57.

(7) The first pressure regulating valve 28 opens the supply channel 22 when the downstream pressure becomes the predetermined negative pressure. Therefore, it is possible to easily adjust the pressure of the liquid in the liquid ejecting portion 15 coupled to the supply channel 22.

(8) The return channel 23 forms the circulation channel 38 together with the supply channel 22. The liquid can circulate through the circulation channel 38. Therefore, even when the liquid is likely to precipitate, for example, precipitation can be reduced by circulating the liquid.

(9) The second pressure regulating valve 29 opens the return channel 23 when the pressure on the second connection portion 36 side exceeds the predetermined pressure. When the return channel 23 is opened, the liquid flows through the return channel 23 to the first connection portion 35 side. Thus, it is possible to reduce the risk of the pressure in the second connection portion 36 getting too high.

MODIFIED EXAMPLE

This embodiment can be implemented with the following changes. This embodiment and the following modified examples can be implemented in combination without any technical conflict with each other.

The flexible portion 46 may have a hole formed therein, through which gas can pass but liquid cannot.

The flexible portion 46 may be made of fluorine resin, polyethylene, polypropylene, silicone, rubber, or the like.

The flexible portion 46 may be provided along a horizontal plane. When the flexible portion 46 is provided along the horizontal plane, it is possible to increase the area of contact of air bubbles in the storage portion 45 with the flexible portion 46 compared to when the flexible portion 46 is provided inclined with respect to the horizontal plane. Therefore, the bubbles in the storage portion 45 can efficiently pass through the flexible portion 46.

The film 62 may be permeable to gas. The gas remaining in the inflow portion 53 may pass through the film 62 and move to the upper chamber 49.

The liquid ejecting apparatus 11 may include a plurality of supply mechanisms 13. The plurality of supply mechanisms 13 may supply different types of liquids. Such different types of liquids are, for example, inks of different colors. The liquid ejecting portion 15 may perform color printing on a medium by ejecting a plurality of types of liquids. The position of the second connection portion 36 may vary depending on the supply mechanism 13. For example, the supply mechanism 13 that supplies a liquid that easily precipitates, such as white ink, may have the second connection portion 36 located closer to the liquid ejecting portion 15, compared with the supply mechanism 13 that supplies a liquid that does not easily precipitate.

The second pressure regulating valve 29 may be provided in the second connection portion 36. The second pressure regulating valve 29 may couple the return channel 23 to the supply channel 22 when the pressure between the pump 27 and the second connection portion 36 exceeds the predetermined pressure.

The liquid ejecting apparatus 11 may be configured without including the return channel 23. The supply mechanism 13 does not have to circulate the liquid. When the liquid ejecting apparatus 11 includes a plurality of supply mechanisms 13, the liquid ejecting apparatus 11 may include the supply mechanism 13 having the supply channel 22 and the return channel 23 and the supply mechanism 13 having the supply channel 22 without the return channel 23.

The pump 27 may be a tube pump, a gear pump, a piston pump, or the like. The pump 27 may be an air-driven diaphragm pump driven by changing the pressure on the outer surface of the diaphragm.

The drive portion 26 may drive the opening/closing portion 57 by applying magnetism. The drive portion 26 may drive the opening/closing portion 57 using a cam, a piston, or the like.

The opening/closing portion 57 may be an electromagnetic valve that operates with the force of an electromagnet, for example.

The storage portion 45 may be formed of a member that is rigid across its entire surface.

The liquid reservoir 25 may be configured without including the air chamber 43. Either one of the compression portion 40 and the decompression portion 41 may be provided in the air chamber 43. For example, the air chamber 43 may be provided with the decompression portion 41. The liquid reservoir 25 may include a compression chamber coupled to the compression portion 40, besides the air chamber 43. The first channel 55 may be opened and closed by pressurizing the compression chamber.

The liquid reservoir 25 may be provided in a device different from the liquid ejecting apparatus 11. The liquid reservoir 25 may be provided in a printing apparatus that performs screen printing, offset printing, or the like, for example.

The liquid ejecting apparatus 11 may be a liquid ejecting apparatus that jets or ejects a liquid other than ink. The state of the liquid ejected from the liquid ejecting apparatus in the form of minute droplets includes granular, teardrop-shaped, and trailing string-like. The liquid referred to here may be any material that can be ejected from the liquid ejecting apparatus. For example, the liquid may be in a state where the substance is in the liquid phase, including a high or low viscosity liquid and fluids such as sol, gel water, other inorganic solvents, organic solvents, solutions, liquid resin, liquid metal, and metallic melt. The liquid includes not only a liquid as one state of a substance, but also those obtained by dissolving, dispersing or mixing particles of a functional material made of a solid substance such as pigment or metal particles in a solvent. Typical examples of the liquid include ink, liquid crystal, and the like as described in the above embodiment. Here, the ink includes general water-based ink and oil-based ink as well as various liquid compositions such as gel ink and hot-melt ink. As a specific example of the liquid ejecting apparatus, there is an apparatus, for example, that ejects a liquid containing a material such as an electrode material and a color material in a dispersed or dissolved state for use in manufacture of a liquid crystal display, an electroluminescence display, a surface-emitting display, and a color filter. The liquid ejecting apparatus may be an apparatus that ejects a bioorganic substance used in biochip fabrication, an apparatus that is used as a precision pipette and ejects a sample liquid, a printing apparatus, a microdispenser, or the like. The liquid ejecting apparatus may be an apparatus that ejects lubricating oil with pinpoint precision to a precision machine such as a watch and a camera, or an apparatus that ejects a transparent resin liquid such as ultraviolet curable resin to form a micro hemispherical lens, an optical lens, and the like used in an optical communication device and the like. The liquid ejecting apparatus may be an apparatus that ejects an acidic or alkaline etchant to etch a substrate or the like.

Definition

As used herein, the expression "at least one" means "one or more" of the desired options. As an example, the expression "at least one" as used herein means "only one option" or "both of the two options" if the number of options is two. As another example, the expression "at least one" used herein means "only one option" or "any combination of two or more options" if the number of options is three or more.

APPENDIX

The technical ideas and advantageous effects thereof that can be grasped from the above-mentioned embodiment and modified examples will be described below.

(A) A liquid reservoir includes: an inflow portion configured to have a liquid flow therethrough; a storage portion configured to store the liquid flowing in through the inflow portion; an outflow portion configured to have the liquid in the storage portion flow out therethrough; a first channel having one end coupled to the outflow portion and the other end opening into the storage portion; a second channel having one end coupled to the outflow portion and the other end opening into the storage portion; and an opening/closing portion configured to open and close the first channel, in which the other end of the first channel opens at a position higher than the other end of the second channel.

According to this configuration, the opening/closing portion can open and close the first channel. When the opening/closing portion closes the first channel, the liquid flowing into the storage portion from the inflow portion flows through the second channel from the other end to one end. The other end of the second channel opens below the other end of the first channel. Therefore, closing the first channel can make it easier to gather air bubbles in the storage portion. When the opening/closing portion opens the first channel, the liquid flowing into the storage portion from the inflow portion flows through the first and second channels from the other end to one end. The other end of the first channel opens above the other end of the second channel. Therefore, when the storage portion is filled with the liquid, for example, the air in the storage portion is readily discharged by opening the first channel. Thus, the air can be easily discharged when filling the liquid.

(B) In the above liquid reservoir, the storage portion may include a flexible portion having flexibility, the opening/closing portion may include the flexible portion and a valve configured to open and close the first channel, and the first channel may be opened by the displaced flexible portion coming into contact with the valve.

According to this configuration, the opening/closing portion opens the first channel by bringing the flexible portion into contact with the valve.

Therefore, the first channel can be opened and closed by displacing the flexible portion from outside the storage portion.

(C) In the above liquid reservoir, the flexible portion may be formed of a film member that is impermeable to the liquid and permeable to gas, and may be provided above the storage portion.

According to this configuration, the upper part of the storage portion is formed of a film member that is impermeable to liquid and permeable to gas. Therefore, the air bubbles trapped in the storage portion can be discharged from the storage portion through the film member.

(D) A liquid ejecting apparatus includes: a liquid ejecting portion configured to eject a liquid; a supply channel that communicates a liquid supply source that houses the liquid with the liquid ejecting portion; a liquid reservoir provided in the middle of the supply channel; and a drive portion, in which the liquid reservoir includes an inflow portion configured to have the liquid flow therethrough, the liquid being supplied from the liquid supply source; a storage portion configured to store the liquid flowing in through the inflow portion; an outflow portion configured to have the liquid in the storage portion flow out therethrough toward the liquid ejecting portion; a first channel having one end coupled to the outflow portion and the other end opening into the storage portion; a second channel having one end coupled to the outflow portion and the other end opening into the storage portion; and an opening/closing portion configured to open and close the first channel, in which the drive portion is configured to drive the opening/closing portion, and the other end of the first channel opens at a position higher than the other end of the second channel.

According to this configuration, the same effects as those of the above liquid reservoir can be achieved.

(E) In the above liquid ejecting apparatus, the storage portion may include a flexible portion having flexibility, the opening/closing portion may include the flexible portion and a valve configured to open and close the first channel, and the first channel may be opened by the flexible portion coming into contact with the valve, the flexible portion being displaced by driving of the drive portion.

According to this configuration, the drive portion displaces the flexible portion. The displaced flexible portion opens the first channel by coming into contact with the valve. Therefore, the drive portion can open and close the first channel from outside of the storage portion.

(F) In the above liquid ejecting apparatus, the flexible portion may be formed of a film member that is impermeable to the liquid and permeable to gas, and may be provided above the storage portion.

According to this configuration, the same effects as those of the above liquid reservoir can be achieved.

(G) In the above liquid ejecting apparatus, the liquid reservoir may further include an air chamber separated from the storage portion by the flexible portion, and the drive portion may include a pressure change portion configured to change a pressure in the air chamber.

According to this configuration, the pressure change portion changes the pressure inside the air chamber to displace the flexible portion. Thus, the first channel can be easily opened and closed.

(H) In the above liquid ejecting apparatus, the liquid reservoir may further include: a pump provided downstream of the liquid reservoir in the supply channel and configured to cause the liquid to flow from upstream to downstream.

According to this configuration, the pump is provided downstream of the liquid reservoir. More specifically, the pump pressurizes the liquid drawn from the liquid reservoir and sends the liquid to the liquid ejecting portion. Therefore, the pressure in the storage portion is lowered compared to the case where the pump is provided upstream of the liquid reservoir. Thus, the drive portion can easily drive the opening/closing portion.

(I) In the above liquid ejecting apparatus, the liquid reservoir may further include: a first pressure regulating valve provided downstream of the pump in the supply channel and configured to open the supply channel when the pressure inside the liquid ejecting portion falls below a predetermined negative pressure.

According to this configuration, the first pressure regulating valve opens the supply channel when the downstream pressure becomes the predetermined negative pressure. Therefore, it is possible to easily adjust the pressure of the liquid in the liquid ejecting portion coupled to the supply channel.

(J) In the above liquid ejecting apparatus, the liquid reservoir may further include: a return channel coupled to a first connection portion provided upstream of the liquid reservoir in the supply channel and to a second connection portion provided downstream of the pump in the supply channel, and configured to form a circulation channel together with the supply channel.

According to this configuration, the return channel forms the circulation channel together with the supply channel. The liquid can circulate through the circulation channel. Therefore, even when the liquid is likely to precipitate, for example, precipitation can be reduced by circulating the liquid.

(K) In the above liquid ejecting apparatus, the liquid reservoir may further include: a second pressure regulating valve provided in the return channel and configured to open the return channel when a pressure on the second connection portion side exceeds a predetermined pressure.

According to this configuration, the second pressure regulating valve opens the return channel when the pressure on the second connection portion side exceeds the predetermined pressure. When the return channel is opened, the liquid flows through the return channel to the first connection portion side. Thus, it is possible to reduce the risk of the pressure in the second connection portion getting too high.

(L) A method for controlling a liquid ejecting apparatus including a liquid ejecting portion configured to eject a liquid, a supply channel that communicates a liquid supply source that houses the liquid with the liquid ejecting portion, a liquid reservoir including an inflow portion configured to have the liquid flow therethrough, the liquid being supplied from the liquid supply source, a storage portion configured to store the liquid flowing in through the inflow portion, an outflow portion configured to have the liquid in the storage portion flow out therethrough toward the liquid ejecting portion, a first channel having one end coupled to the outflow portion and the other end opening into the storage portion, a second channel having one end coupled to the outflow portion and the other end opening into the storage portion, and an opening/closing portion configured to open and close the first channel, a drive portion configured to drive the opening/closing portion, and a pump configured to cause the liquid in the supply channel to flow from the liquid supply source side to the liquid ejecting portion side, in which the other end of the first channel opens at a position higher than the other end of the second channel, the method including: opening the first channel by the drive portion driving the opening/closing portion; filling the supply channel, the liquid reservoir, and the liquid ejecting portion with the liquid by driving the pump with the first channel opened; closing the first channel by the drive portion driving the opening/closing portion; and supplying the liquid to the liquid ejecting portion through the second channel.

According to this method, the same effects as those of the above liquid reservoir can be achieved.

(M) A method for controlling a liquid ejecting apparatus including a liquid ejecting portion configured to eject a liquid, a supply channel that communicates a liquid supply source that houses the liquid with the liquid ejecting portion, a liquid reservoir including an inflow portion configured to have the liquid flow therethrough, the liquid being supplied from the liquid supply source, a storage portion configured to store the liquid flowing in through the inflow portion, an outflow portion configured to have the liquid in the storage portion flow out therethrough toward the liquid ejecting portion, a first channel having one end coupled to the outflow portion and the other end opening into the storage portion, a second channel having one end coupled to the outflow portion and the other end opening into the storage portion, and an opening/closing portion configured to open and close the first channel, a drive portion configured to drive the opening/closing portion, and a pump configured to cause the liquid in the supply channel to flow from the liquid supply source side to the liquid ejecting portion side, and a return channel coupled to a first connection portion provided upstream of the liquid reservoir in the supply channel and a second connection portion provided downstream of the liquid reservoir in the supply channel, and configured to form a circulation channel together with the supply channel, in which the other end of the first channel opens at a position higher than the other end of the second channel, the method including: opening the first channel by the drive portion driving the opening/closing portion; filling the supply channel, the liquid reservoir, and the liquid ejecting portion with the liquid by driving the pump with the first channel opened; closing the first channel by the drive portion driving the opening/closing portion; filling the return channel with the liquid by driving the pump with the first channel closed; and supplying the liquid to the liquid ejecting portion through the second channel.

According to this method, the same effects as those of the above liquid reservoir can be achieved.

What is claimed is:

1. A liquid reservoir comprising:

an inflow portion configured to have a liquid flow therethrough;

a storage portion configured to store the liquid flowing in through the inflow portion;

an outflow portion configured to have the liquid in the storage portion flow out therethrough;

a first channel having one end coupled to the outflow portion and the other end opening into the storage portion;

a second channel having one end coupled to the outflow portion and the other end opening into the storage portion; and an opening/closing portion configured to open and close the first channel, wherein the other end of the first channel opens at a position higher than the other end of the second channel.

2. The liquid reservoir according to claim 1, wherein the storage portion includes a flexible portion having flexibility, the opening/closing portion includes the flexible portion and a valve configured to open and close the first channel, and the first channel is opened by the displaced flexible portion coming into contact with the valve.

3. The liquid reservoir according to claim 2, wherein the flexible portion is formed of a film member that is impermeable to the liquid and permeable to gas, and is provided above the storage portion.

4. A liquid ejecting apparatus comprising:

a liquid ejecting portion configured to eject a liquid;

a supply channel that communicates a liquid supply source that houses the liquid with the liquid ejecting portion;

a liquid reservoir provided in the middle of the supply channel; and a drive portion, wherein the liquid reservoir includes an inflow portion configured to have the liquid flow therethrough, the liquid being supplied from the liquid supply source;

a storage portion configured to store the liquid flowing in through the inflow portion;

an outflow portion configured to have the liquid in the storage portion flow out therethrough toward the liquid ejecting portion;

a first channel having one end coupled to the outflow portion and the other end opening into the storage portion;

a second channel having one end coupled to the outflow portion and the other end opening into the storage portion; and an opening/closing portion configured to open and close the first channel, wherein the drive portion is configured to drive the opening/closing portion, and the other end of the first channel opens at a position higher than the other end of the second channel.

5. The liquid ejecting apparatus according to claim 4, wherein the storage portion includes a flexible portion having flexibility, the opening/closing portion includes the flexible portion and a valve configured to open and close the first channel, and the first channel is opened by the flexible portion coming into contact with the valve, the flexible portion being displaced by driving of the drive portion.

6. The liquid ejecting apparatus according to claim 5, wherein the flexible portion is formed of a film member that is impermeable to the liquid and permeable to gas, and is provided above the storage portion.

7. The liquid ejecting apparatus according to claim 6, wherein the liquid reservoir further includes an air chamber separated from the storage portion by the flexible portion, and the drive portion includes a pressure change portion configured to change a pressure in the air chamber.

8. The liquid ejecting apparatus according to claim 4, further comprising:

a pump provided downstream of the liquid reservoir in the supply channel and configured to cause the liquid to flow from upstream to downstream.

9. The liquid ejecting apparatus according to claim 8, further comprising:

a first pressure regulating valve provided downstream of the pump in the supply channel and configured to open the supply channel when the pressure inside the liquid ejecting portion falls below a predetermined negative pressure.

10. The liquid ejecting apparatus according to claim 8, further comprising:

a return channel coupled to a first connection portion provided upstream of the liquid reservoir in the supply channel and to a second connection portion provided downstream of the pump in the supply channel, and configured to form a circulation channel together with the supply channel.

11. The liquid ejecting apparatus according to claim 9, further comprising:

a second pressure regulating valve provided in the return channel and configured to open the return channel when a pressure on the second connection portion side exceeds a predetermined pressure.

12. The liquid ejecting apparatus according to claim 10, further comprising:

a second pressure regulating valve provided in the return channel and configured to open the return channel when a pressure on the second connection portion side exceeds a predetermined pressure.

13. A method for controlling a liquid ejecting apparatus including a liquid ejecting portion configured to eject a liquid, a supply channel that communicates a liquid supply source that houses the liquid with the liquid ejecting portion, a liquid reservoir including an inflow portion configured to have the liquid flow therethrough, the liquid being supplied from the liquid supply source, a storage portion configured to store the liquid flowing in through the inflow portion, an outflow portion configured to have the liquid in the storage portion flow out therethrough toward the liquid ejecting portion, a first channel having one end coupled to the outflow portion and the other end opening into the storage portion, a second channel having one end coupled to the outflow portion and the other end opening into the storage portion, and an opening/closing portion configured to open and close the first channel, a drive portion configured to drive the opening/closing portion, and a pump configured to cause the liquid in the supply channel to flow from the liquid supply source side to the liquid ejecting portion side, wherein the other end of the first channel opens at a position higher than the other end of the second channel, the method comprising:

opening the first channel by the drive portion driving the opening/closing portion;

filling the supply channel, the liquid reservoir, and the liquid ejecting portion with the liquid by driving the pump with the first channel opened;

closing the first channel by the drive portion driving the opening/closing portion; and supplying the liquid to the liquid ejecting portion through the second channel.

14. The method for controlling a liquid ejecting apparatus according to claim 12, wherein the liquid ejecting apparatus further includes a return channel coupled to a first connection portion provided upstream of the liquid reservoir in the supply channel and a second connection portion provided downstream of the liquid reservoir in the supply channel, and configured to form a circulation channel together with the supply channel, the method further comprising:

filling the return channel with the liquid by driving the pump with the first channel closed.

* * * * *